US012737323B2

(12) United States Patent
Low et al.

(10) Patent No.: US 12,737,323 B2
(45) Date of Patent: *Sep. 15, 2026

(54) DATA INDEXING AND DEDUPLICATION USING CONTENT-DEFINED TREES

(71) Applicant: Hugging Face, Inc., Brooklyn, NY (US)

(72) Inventors: Yucheng Low, Brooklyn, NY (US); Ajit Banerjee, Brooklyn, NY (US); Rajat Arya, Brooklyn, NY (US)

(73) Assignee: HUGGING FACE, INC., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/822,134

(22) Filed: Aug. 31, 2024

(65) Prior Publication Data

US 2024/0419631 A1 Dec. 19, 2024

Related U.S. Application Data

(63) Continuation of application No. 17/980,531, filed on Nov. 3, 2022, now Pat. No. 12,079,163.

(Continued)

(51) Int. Cl.
*G06F 17/00* (2019.01)
*G06F 16/11* (2019.01)
(Continued)

(52) U.S. Cl.
CPC .......... *G06F 16/137* (2019.01); *G06F 16/116* (2019.01); *G06F 16/185* (2019.01);
(Continued)

(58) Field of Classification Search
CPC .... G06F 16/137; G06F 16/116; G06F 16/185; G06F 16/215; G06F 16/2246;
(Continued)

(56) References Cited

U.S. PATENT DOCUMENTS 6,704,730 B2 3/2004 Moulton et al.
7,680,998 B1 3/2010 Auchmoody et al.
(Continued)

OTHER PUBLICATIONS

Bracciano. "A Tree-View Angular Component Tale—Part 2: Nested Information." 2020, pp. 1-21. https://ioannesbracciano.medium.com/ng-tree-view-tale-pt-2-14e25e7e78f6. (Year: 2020).

(Continued)

*Primary Examiner* — Greta L Robinson

(57) ABSTRACT

In some aspects, a computing system may generate a content-defined tree. A content-defined tree may be a tree of cryptographic hashes where each leaf is a hash of a chunk (e.g., data chunk) of a data object, and each parent node (e.g., interior node) is the hash of a concatenation of the hashes of the parent's children nodes. To create parent nodes for the leaf nodes, a computing system may group leaf nodes together based on a rolling hash (e.g., a rolling hash of the hashes of the leaf nodes) satisfying a condition. Each parent node may include a hash that represents the concatenation of the hashes of the leaf nodes that fall under the corresponding parent node.

20 Claims, 8 Drawing Sheets

Related U.S. Application Data

(60) Provisional application No. 63/299,832, filed on Jan. 14, 2022.

(51) Int. Cl.

| | |
|---|---|
| ***G06F 16/13*** | (2019.01) |
| ***G06F 16/185*** | (2019.01) |
| ***G06F 16/215*** | (2019.01) |
| ***G06F 16/22*** | (2019.01) |
| ***G06F 16/25*** | (2019.01) |
| ***H04L 9/06*** | (2006.01) |

(52) U.S. Cl.
CPC ........ *G06F 16/215* (2019.01); *G06F 16/2246* (2019.01); *G06F 16/2255* (2019.01); *G06F 16/258* (2019.01); *H04L 9/0643* (2013.01)

(58) Field of Classification Search
CPC . G06F 16/2255; G06F 16/258; H04L 9/0643; H04L 9/50
See application file for complete search history.

(56) References Cited

U.S. PATENT DOCUMENTS

| | | | | |
|---|---|---|---|---|
| 7,868,792 | B2 | 1/2011 | Artan | |
| 8,386,835 | B2 | 2/2013 | Dilger | |
| 10,496,313 | B2 * | 12/2019 | Mayo | G06F 3/0644 |
| 12,079,163 | B2 * | 9/2024 | Low | G06F 16/137 |
| 2004/0220975 | A1 | 11/2004 | Carpentier et al. | |
| 2010/0011013 | A1 | 1/2010 | Singh | |
| 2015/0220578 | A1 | 8/2015 | Hunt et al. | |
| 2016/0188589 | A1 | 6/2016 | Guilford et al. | |
| 2021/0096776 | A1 | 4/2021 | Kim et al. | |
| 2021/0166401 | A1 | 6/2021 | Zhang | |
| 2021/0286792 | A1 * | 9/2021 | Irazabal | G06F 16/2246 |
| 2023/0229628 | A1 | 7/2023 | Low | |
| 2023/0229643 | A1 | 7/2023 | Low | |

OTHER PUBLICATIONS

Quinlan, Sean and Sean Doward, "Venti: A new approach to archival data storage." Conference on file and storage technologies (FAST 02). 2002 (Year: 2002).

Tolia, Niraj, et al. "Opportunistic Use of Content Addressable Storage for Distributed File Systems." USENIX Annual Technical Conference, General Track. vol. 3. 2003 (Year: 2003).

Ding et al. "An Approach for Validating Quality of Datasets for Machine Learning." 2018. IEEE International Conference on Big Data, pp. 2795-2803. (Year: 2018).

* cited by examiner

200

500

600

DATA INDEXING AND DEDUPLICATION USING CONTENT-DEFINED TREES

CROSS-REFERENCE TO RELATED APPLICATION(S)

This application is a continuation of Ser. No. 17/980,531, filed Nov. 3, 2022, which claims the benefit of priority to U.S. Provisional Patent Application No. 63/299,832 filed on Jan. 14, 2022, and entitled "CDC Tree," which are incorporated herein by reference in their entirety.

SUMMARY

A system for providing versioning of large data objects, may seek to minimize storage and network utilization. For example, the system should not need to upload an entire object to create a new version of the object, and each version of the object should not require an entire new copy to be stored. Ideally only a small description of the set of changes (e.g., a delta) may be used to represent a new version. This is known as the data deduplication problem.

Existing systems fail to adequately address the deduplication problem for a variety of reasons. For example, existing systems may be unable to compute differences between data objects efficiently without complete access to the original source data object, may fail to provide flexibility between large and small data chunks that would allow more efficient storage and management of data, may be unable to handle insertions and deletions in the middle of data objects efficiently, and may fail to minimize the transmission costs of renaming, reorganizing, and moving data objects (e.g., small data objects) without incurring large transmission costs.

To address these issues, systems and methods described herein use a novel data structure called a content-defined tree to assist with indexing and storing data. A content-defined tree may be a tree of cryptographic hashes where each leaf is a hash of a chunk (e.g., data chunk) of a data object, and each parent node (e.g., interior node) is the hash of a concatenation of the hashes of its children nodes. To create parent nodes for the leaf nodes, a computing system may group leaf nodes together based on a rolling hash (e.g., a rolling hash of the hashes of the leaf nodes) satisfying a condition. Each parent node may include a hash that represents the concatenation of the hashes of the leaf nodes that fall under the corresponding parent node.

Through the use of a content-defined tree, the computing system may be able to efficiently index data while preserving the ability to also efficiently determine the differences between two data objects. For example, given a hash of a data chunk and a parent node, a computing system may be able to efficiently determine whether a particular data object includes the data chunk. Further, a computing system may be able to more efficiently compare two data objects using content-defined trees because a hash match at a parent node indicates that all children nodes (e.g., and underlying data chunks) match. This allows the computing system to quickly move on to subsequent branches of the content-defined trees. As an extension of this benefit, through the use of content-defined trees, a computing system may be able to more efficiently work with partial data objects. For example, if only the beginning portion of a data object is needed, the computing system can download just the first (e.g., left) branch of the tree without downloading other portions. By doing so, the computing system may reduce network traffic and reduce the need for additional network resources (e.g., bandwidth, throughput, etc.).

In some aspects, a computing system may obtain a data object comprising a string of bytes. The computing system may divide the string of bytes into a set of chunks, each chunk in the set of chunks having a boundary, wherein each boundary is determined based on a first rolling hash satisfying a first condition and each boundary defines a size of a corresponding chunk. The computing system may generate a content-defined tree by: generating a set of hashes comprising a cryptographic hash for each chunk of the set of chunks, wherein the set of hashes form a first tier of the content-defined tree; generating a set of parent nodes by grouping each hash of the set of hashes based on a second rolling hash satisfying a second condition, and by hashing a concatenation of each resulting group of hashes, wherein the set of parent nodes form a second tier of the content-defined tree; and generating a root node by merging each node in the set of parent nodes. The computing system may store a portion of the content-defined tree in a database.

Further, generation or use of a content-defined tree leads to a novel technical problem in that there should be an effective way to use the content-defined tree in one or more databases to enable stored data to be indexed, deduplicated, and retrieved to recreate data objects (e.g., after the data object is requested from a user device). Existing systems provide no solution for how a content-defined tree may be used effectively for data storage, deduplication, and retrieval.

To address these issues, systems and methods described herein may use multiple content-defined trees to index and retrieve a data object. For example, one content-defined tree may be used to represent all of the chunks that are needed to reproduce a data object and one or more other content-defined trees may be used to indicate where each of the data object's chunks may be found in a storage system. Although the content-defined trees may be constructed in a similar manner, content-defined trees used to indicate where each of a data object's chunks are located in a database may be referred to herein as content-addressed storage (CAS) trees, while content-defined trees may be used to refer to trees that indicate all of the chunks needed to reconstruct a data object. A computing system may use multiple CAS trees to index and deduplicate data in a database. When a data object needs to be retrieved from the database, the computing system may obtain a content-defined tree associated with the data object and compare nodes of the content-defined tree with nodes of the multiple CAS trees. If a matching node is found, the computing system may retrieve any leaf nodes that fall under the matching node.

In some aspects, a computing system may obtain a request for a data object in a database, wherein the request comprises an identification of the data object. Based on the request and the identification of the data object, the computing system may retrieve a content-defined tree corresponding to the data object, wherein the content-defined tree comprises a set of parent nodes, each parent node corresponding to a set of hashes that have been determined using a rolling hash and a grouping condition, wherein each parent node comprises a hash of a concatenation of each hash in a corresponding set of hashes, wherein the set of parent nodes form a tier of the content-defined tree, and wherein each hash in each set of hashes corresponds to a chunk in the data object. The computing system may determine a first node by traversing the content-defined tree and may compare the first node with a set of CAS tree nodes. Based on a hash of the first node matching a hash of a first CAS tree node of the set of CAS tree nodes, the computing system may traverse a first CAS tree corresponding to the first CAS tree node, wherein the first CAS tree comprises a set of parent nodes, wherein each parent node comprises a hash of a concatenation of each hash in a corresponding set of hashes, and wherein each hash in each set of hashes corresponds to a chunk stored in the database. Based on traversing the first CAS tree, the computing system may obtain a set of child nodes of the first CAS tree node, wherein each child node comprises a hash usable as a key to retrieve a location of a chunk of the data object. The computing system may retrieve, based on the set of child nodes, a set of data object chunks and may reconstruct the data object based on the set of data object chunks.

An additional technical problem addressed by the present disclosure is how to extend the deduplication and indexing properties of content-defined trees across multiple databases. Existing systems fail to efficiently share and deduplicate data across multiple databases (e.g., databases owned by different organizations). To address these issues, systems and methods described herein use content-defined trees for sharing or deduplicating data in multiple databases. Due to the structure of the content-defined trees and the hashes contained in the nodes of the trees, the computing system may be able to efficiently compare and deduplicate data across databases. For example, if a node of a first content-defined tree in a first database matches a node of a second content-defined tree in a second database, the computing system may remove one of the nodes and all children nodes of the node from the second database. This may be done because each node may store a hash that is representative of hashes of corresponding children nodes. Thus, if the hashes of two parent nodes are the same, the computing system may assume that a set of leaf nodes that belong to the first parent node is the same as a set of leaf nodes that belong to the second parent node. In this way, the computing system may be able to more efficiently delete or remove duplicate nodes and data (e.g., chunks), thereby reducing storage costs and related overhead of computing systems.

In some aspects, a computing system may obtain a request to integrate first data of a legacy database with second data of a CAS database. The computing system may generate a first content-defined tree corresponding to the legacy database, wherein the first content-defined tree comprises a first set of parent nodes, each parent node of the first set of parent nodes corresponding to a set of hashes that have been determined using a rolling hash and a grouping condition, wherein each parent node comprises a hash of a concatenation of each hash in a corresponding set of hashes, wherein the first set of parent nodes form a tier of the first content-defined tree, and wherein each hash in each set of hashes corresponds to a portion of data in the legacy database. The computing system may obtain a second content-defined tree corresponding to the CAS database, wherein the second content-defined tree comprises a second set of parent nodes, each parent node in the second set of parent nodes comprising a concatenated hash corresponding to a set of leaf nodes. Based on comparing the first content-defined tree with the second content-defined tree, the computing system may remove a duplicate portion of data from the legacy database or the CAS database.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
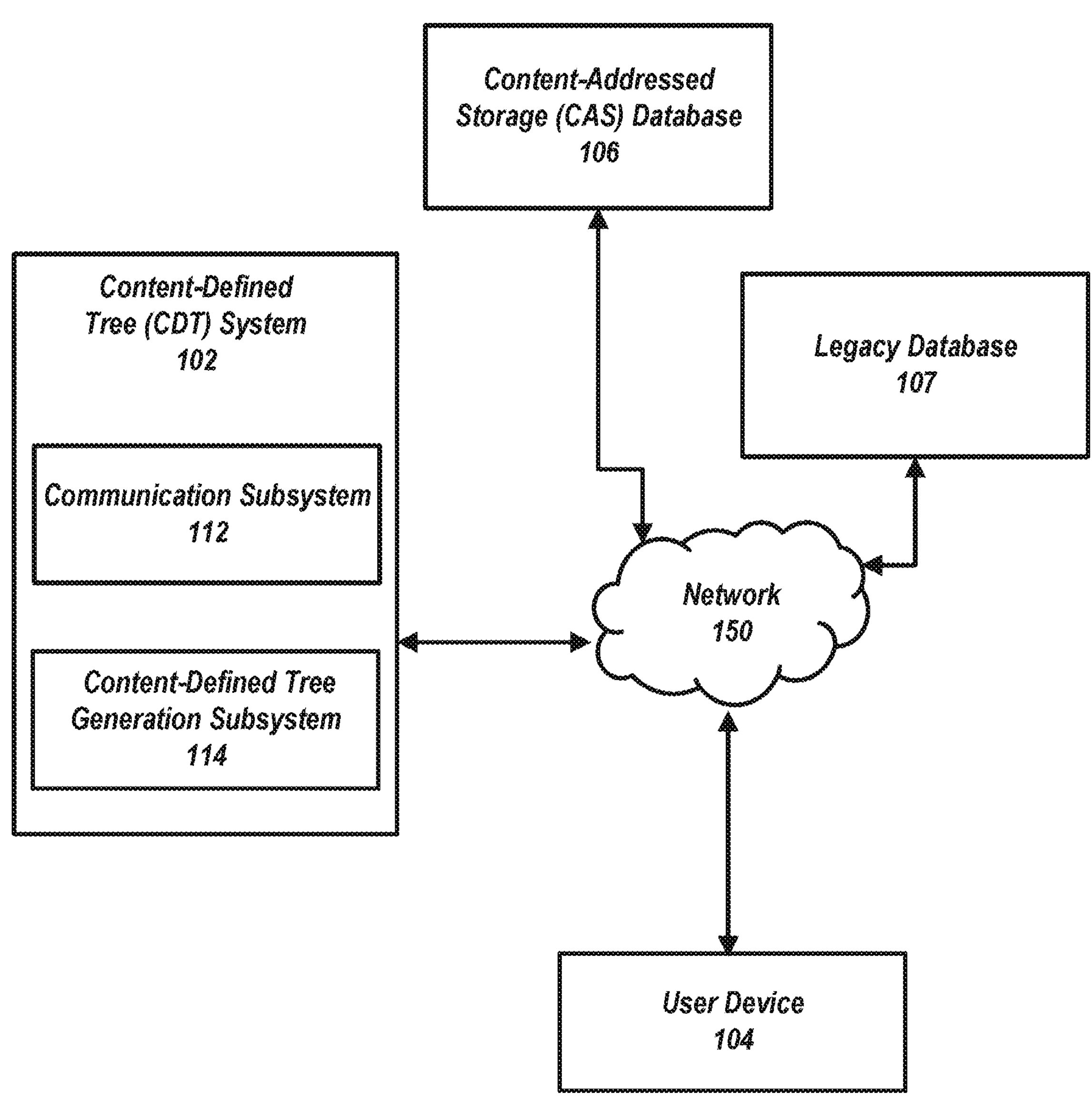
FIG. 1 shows an illustrative diagram for generating and using content-defined trees, in accordance with one or more embodiments.

FIG. 1 shows an illustrative system 100 that may address the above-described problems, for example, through the use of content-defined trees. A content-defined tree may be a tree of cryptographic hashes (e.g., SHA-3, Whirlpool, RIPEMD-160, etc.) where each leaf is a hash of a chunk (e.g., data chunk) of a data object, and each parent node (e.g., interior node) is the hash of a concatenation of the hashes of its children nodes. To create parent nodes for the leaf nodes, a computing system may group leaf nodes together based on a rolling hash (e.g., a rolling hash of the hashes of the leaf nodes) satisfying a condition. Each parent node may include a hash that represents the concatenation of the hashes of the leaf nodes that fall under the corresponding parent node.

Through the use of a content-defined tree, the system 100 may be able to efficiently index data while preserving the ability to also efficiently determine the differences between two data objects. For example, given a hash of a data chunk and a parent node, the system 100 may be able to efficiently determine whether a particular data object includes the data chunk. Further, the system 100 may be able to more efficiently compare two data objects using content-defined trees because a hash match at a parent node may indicate that all children nodes (e.g., and underlying data chunks) match. This may allow the system 100 to quickly move on to subsequent branches of the content-defined trees. As an extension of this benefit, through the use of content-defined trees, the system 100 may be able to more efficiently work with partial data objects. For example, if only the beginning portion of a data object is needed, the system 100 can download just the first (e.g., left) branch of the tree without downloading other portions. By doing so, the system 100 may reduce network traffic and reduce the need for additional network resources (e.g., bandwidth, throughput, etc.).

The system 100 may include a content-defined tree system 102 (CDT system 102), a CAS database 106, a legacy database 107, and a user device 104, any of which may communicate with each other or other devices via a network 150. The CDT system 102 may include a communication subsystem 112, a content-defined tree generation subsystem 114, or other components.

The system 100 may use one or more content-defined trees to provide the benefits of allowing data objects to be summarized, supporting middle of data object changes efficiently, and handling multiple small data objects efficiently. Through the use of a content-defined tree, the system 100 may be able to produce a summary data structure for each data object (e.g., file) that can allow deltas (e.g., differences between data objects) to be computed efficiently without complete access to the original source data object. In addition, content-defined trees may allow the system 100 to produce large data chunks (e.g., chunks greater than a threshold size) which are more efficient to store and manage. Further, by representing a data object as a content-defined tree, the system 100 may be more tolerant to insertions and deletions in the middle of data objects. Finally, through the use of content-defined trees, the system 100 may minimize the overhead (e.g., network traffic, etc.) that comes when multiple small data objects are compared or otherwise used. The system 100 may use content-defined trees to permit users to rename, reorganize, and move data objects around without incurring large transmission costs.

Figure 2A:
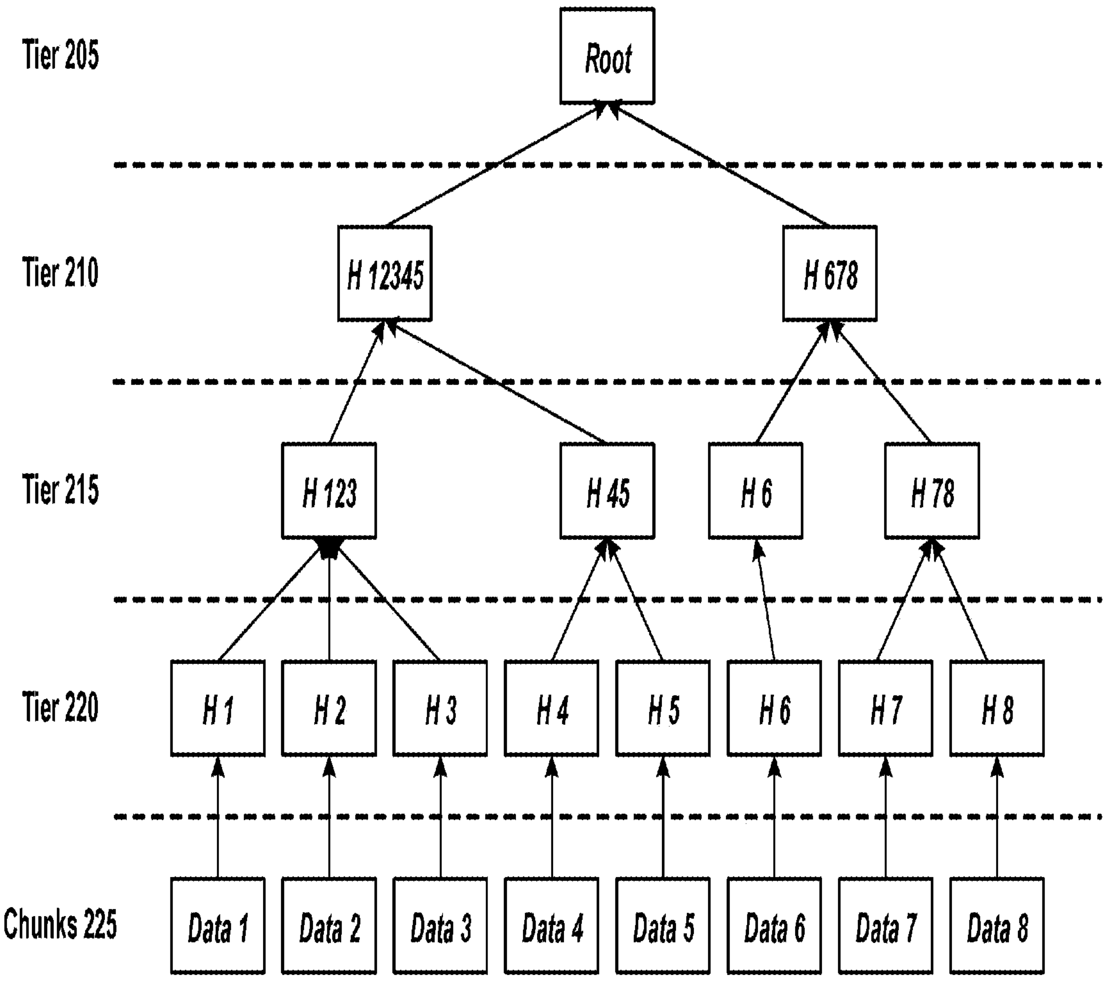
FIG. 2A shows an example content-defined tree, in accordance with one or more embodiments.

Referring to FIG. 2A, an example content-defined tree 200 is shown. The content-defined tree 200 may be generated by a computing device such as the CDT system 102 (e.g., as described in connection with FIG. 1 or FIG. 4). The example content-defined tree 200 may include four tiers 205-220 and may be based on the chunks 225. The chunks 225 may have been generated based on a data object as described in more detail below (e.g., using a rolling hash or condition). Tier 220 may include a set of hashes H1-H8. Each hash in tier 220 may correspond to one chunk of the chunks 225. For example, the hash H1 may correspond to the chunk labeled Data 1, the hash H2 may correspond to the chunk labeled Data 2, and so on. Each hash in tier 220 may be a cryptographic hash or a variety of other hashes.

The hashes in tier 220 may be grouped together using a rolling hash and condition, for example, as described in more detail below in connection with FIG. 1. The hashes in tier 220 may be leaf nodes of the content-defined tree 200, for example, because they are the bottom most nodes in the content-defined tree (e.g., they are direct hashes of the chunks 225). The groups of hashes may be used to generate parent nodes that form tier 215. For example, based on a condition and a rolling hash, the CDT system 102 may determine that hashes H1-H3 belong in one group. The CDT system 102 may concatenate each of hashes H1-H3 and a message authentication code (MAC) of the hashes H1-H3. The CDT system 102 may then generate a hash of the resulting concatenation (e.g., that includes hashes H1-H3 and the MAC) to form the hash for the parent node H123. The CDT system 102 may determine, based on a hash of a concatenated hash of H4 and H5, that both H4 and H5 should be grouped together. In response, the CDT system 102 may generate the parent H45 and a hash that is based on the concatenation of the hashes of H4 and H5. A hash of the hash H6 may satisfy the grouping condition, and thus the CDT system 102 may generate a parent node in tier 215 that corresponds to H6. Hashes H7 and H8 may be used to generate an additional parent node in Tier 215.

The CDT system 102 may generate an additional tier 210 that includes parent nodes of the parent nodes in tier 215. The parent nodes in tier 210 may be generated in a similar manner that the parent nodes in tier 215 were generated. For example, a hash of a concatenation of the hashes in H123 and H45 may satisfy the grouping condition. Based on the grouping condition being satisfied, the CDT system 102 may generate the parent node H12345 which may be based on a hash of the concatenation of the hashes stored in parent nodes H123 and H45. A root node may be generated and may include a hash that is based on the hashes stored in parent nodes H12345 and H678.

Referring back to FIG. 1, the CDT system 102 may obtain a data object (e.g., via the communication subsystem 112). As used herein, a data object may be a collection of one or more data points that create meaning as a whole. A data object may include a data structure, a file, a blob, a hash, a collection of memory addresses or the contents of the memory addresses, or a variety of other data objects. The data object may include a string of bytes. The data object may correspond to a file (e.g., CSV, PDF, SQL, or a variety of other file types). The data object may be associated with a repository of data. For example, the data object may be one file in a directory containing other files.

The CDT system 102 may divide the data object into chunks. For example, the CDT system 102 may divide the string of bytes into a set of chunks, each chunk in the set of chunks having a boundary. Each boundary may define the size of a corresponding chunk. As used herein, a chunk may be a portion of a data object. A chunk may be a fragment of information which may be used in a variety of multimedia file formats. A chunk may include a header which indicates some parameters. A chunk may include a variable area containing data, which, for example, may be decoded by a computing device using parameters in the header.

In some embodiments, a boundary for a chunk may be determined based on a rolling hash and a condition. A rolling hash may be a hash function where the input is hashed in a window that moves through the input. For example, the input for the rolling hash may be taken from the contents of a data object. In one example, the rolling hash may start with a portion of the data object (e.g., a minimum amount, an amount greater than a threshold amount, which may be 16 kilobytes in some examples) and a hash may be generated based on the portion. The CDT system 102 may compare the generated hash with a condition. For example, the condition may require the generated hash to be less than a threshold value. If the generated hash does not satisfy the condition, the CDT system 102 may add additional data from the data object to the portion used as input to the rolling hash resulting in an extended portion. A new hash may be generated for the extended portion and the condition may be checked again for the new hash. If the condition is satisfied, the CDT system 102 may designate the extended portion as a chunk and the process may continue with the remainder of the data object until the data object is fully divided into chunks.

In some embodiments, the CDT system 102 may set a maximum or minimum chunk size. If the input to the hash function satisfies the maximum chunk size, the CDT system 102 may designate the input as a chunk regardless of whether the condition is satisfied or not. In some embodiments, the CDT system 102 may make sure that no chunk is smaller than a minimum chunk size (e.g., no less than 16 KB, etc.).

By dividing the data object into chunks, the CDT system 102 may be able to use the chunks to generate a content-defined tree and may provide a data object storage solution that is able to more efficiently handle insertions or deletions made in the middle of the data object. For example, dividing the data object into chunks in this way may allow for insertions and deletions to be made in the middle of the data object without altering every chunk boundary and may prevent the need for the CDT system 102 to recompute every chunk for the data object.

The CDT system 102 may generate a hash for each chunk of the data object. For example, the CDT system 102 may generate a set of hashes that includes a cryptographic hash for each chunk. The set of hashes may form a first tier (e.g., a bottom tier) of a content-defined tree.

The CDT system 102 may generate a set of parent nodes based on the set of hashes. The CDT system 102 may assign each hash of the set of hashes to a group based on a rolling hash and a condition. The condition may be a test on the node hash to cause an average branching factor or average group size (e.g., 4 hashes per group on average with one group belonging to one parent node).

In some embodiments, a boundary for a parent node (e.g., the number of child nodes that are assigned to one parent node) may be determined based on a rolling hash and a condition. The rolling hash may be any rolling hash function described above (e.g., a hash function where the input is hashed in a window that moves through the input). For example, the input for the rolling hash may be data stored in the leaf nodes (e.g., the hashes of each chunk of the data object). In one example, the rolling hash may start with the hash of a first leaf node and a hash of the hash of the first leaf node may be generated. The CDT system 102 may compare the hash of the hash with a condition. For example, the condition may require the hash of the hash to be less than a threshold value. As an additional example, the condition may require the hash of the hash to be greater than a threshold value. As an additional example, the condition may require the last two bits of the hash to be greater than or less than a threshold value.

If the generated hash does not satisfy the condition, the CDT system 102 may concatenate the hash of the first leaf node with the hash of a second leaf node. The CDT system 102 may use the concatenated hash as input to the hash function. A hash of the concatenated hash may be generated and the condition may be checked again for the hash of the concatenated hash. If the condition is satisfied, the CDT system 102 may assign the first and second leaf nodes to a parent node. The hash stored by the parent node may be the hash of the concatenated hash. In this way the parent node may represent the first and second leaf nodes. The process may continue until all leaf nodes are assigned to a parent node. The CDT system 102 may continue generating the content-defined tree by generating parent nodes of parent nodes, for example, as described in connection with FIG. 2A above. The process may continue until a root node is generated (e.g., all parent nodes at one tier are assigned to one root node).

In some embodiments, the CDT system 102 may set a maximum or minimum number of nodes that may belong to any one parent node. For example, if the maximum number of nodes is four, the CDT system 102 may limit the number of nodes that are directly linked (e.g., through adjacent tiers) to a parent node to four. For example, a parent node in a first tier may have no more than four children nodes in a second tier that is immediately below the first tier (e.g., with no tiers in between the first and second tier).

In some embodiments, the CDT system 102 may take extra measures to prevent hash collisions. For example, a hash of a concatenated hash described above may be based on a MAC corresponding to the concatenated hash. When generating a hash for a parent node, for example, the CDT system 102 may concatenate each hash of the children nodes of the parent node (e.g., the children nodes that form the tier immediately below the parent node) to form a concatenated hash.

The CDT system 102 may further concatenate a MAC with the concatenated hashes. The CDT system 102 may generate the MAC based on the concatenated hash. For example, the CDT system 102 may use the concatenated hash as the basis for the MAC. In one example, the CDT system 102 may generate a hash of a MAC together with a corresponding concatenation of each hash in a group of hashes. In this example, both the MAC and group of hashes may be input into the hashing function to generate a single hash. By doing so, the CDT system 102 may ensure that for any two different strings (e.g., hashes, groups of hashes, etc.) there are no collisions. This may prevent two different chunks, groups of chunks, or parent nodes from having the same hash.

In some embodiments, additional constraints may be used to force the number of hashes per parent node (e.g., per group) to be between two and eight, inclusive. In one example, a group of child nodes may correspond to one parent node in the set of parent nodes. The CDT system 102 may concatenate each hash in the group of child nodes. The CDT system 102 may generate a hash of the concatenated hashes to form the hash of the parent node of the group of hashes (e.g., the parent node may be the hash of the concatenated hashes). Each parent node may include a hash that is usable as a key to retrieve each hash in the corresponding group of hashes. For example, a first parent node may include a hash that may key to a data structure that includes each hash of the group of hashes that was used to generate the first parent node. The parent nodes may form a second tier of the content-defined tree. A content-defined tree may have any number of tiers of child nodes or parent nodes.

The CDT system 102 may generate a root node based on the parent nodes generated at step 408. For example, the CDT system 102 may merge each of the parent nodes to form the root node. In one example, the CDT system 102 may generate the root node by applying a rolling hash with a condition to a set of parent nodes. Based on applying the rolling hash, the CDT system 102 may determine that each parent node in the set of parent nodes should be combined into one group. In response, the CDT system 102 may concatenate each of the parent nodes (e.g., the hashes of the parent nodes) and generate a hash of the concatenation. The root node may comprise the hash of the concatenation. In some embodiments, the concatenation may include a MAC generated based on hashes of the parent nodes.

The CDT system 102 may store a portion of the content-defined tree (e.g., in the database 106). In some embodiments, the CDT system 102 may generate a content-defined tree that includes multiple files or an entire data repository. For example, a data object obtained by the CDT system 102 may be part of a set of data objects that is stored in a data repository. The CDT system 102 may generate, based on the data repository, a metadata store comprising a directory layout and metadata of the data repository. The CDT system 102 may generate a byte stream comprising a concatenation of all bytes of all data objects in the data repository. The concatenation may be sorted in hash order. The CDT system 102 may generate a second content-defined tree based on the byte stream. In some embodiments, the CDT system 102 may insert a chunk boundary at an end of each data object in the data repository. This may cause a new chunk to be created for the beginning of every data object or file in the repository.

In some embodiments, the data repository may correspond to a dataset for training a machine learning model. The CDT system 102 may use the content-defined tree to split the data repository into train, test, validation, or other sets to use in training the machine learning model. The CDT system 102 may designate a first portion of the set of parent nodes as a training dataset and a second portion of the set of parent nodes as a testing dataset, and train the machine learning model using the training dataset and the testing dataset.

In some embodiments, the CDT system 102 may use the content-defined tree to compare data objects to determine a difference between the data objects. For example, the CDT system 102 may determine, based on a comparison of the content-defined tree with a second content-defined tree, that the data object has been modified. Based on the modification to the data object, the CDT system 102 may update a hash of a parent node of the set of parent nodes to include the modification. For example, one or more new chunks may be generated for the data object because of the modification made to the data object. A new hash may be created for a new chunk and may be inserted into the content-defined tree. Any parent nodes of the new hash may be generated based on the changes.

Content-Addressed Storage (CAS)

The system 100 may use one or more content-defined trees to indicate where each of a data object's chunks may be found in a storage system by mapping hashes of chunks to storage locations (e.g., memory addresses). By doing so, the system 100 may provide a storage architecture that can efficiently handle small files, sparse diffs, and large files.

To do so, the CAS database 106 may be used. The CAS database 106 may be a key-value store where the key may be based on a hash of a corresponding chunk. A hash of a chunk may be used to determine the location and retrieve the chunk. For example, by storing appropriate nodes of a content-defined tree in the CAS database 106, the CDT system 102 may be able to recover the contents of any hash in a content-defined tree.

The CAS database 106 may store content-defined trees that may be used to find the locations (e.g., in memory) where chunks may be found. The content-defined trees stored in the CAS database 106 may be referred to as CAS trees. Other content-defined trees may be used to keep track of what chunks belong to what data objects. For example, a content-defined tree may correspond to a data object and may identify each chunk that can be used to recreate the data object. By comparing the nodes of the content-defined tree that represents the data object with nodes of one or more CAS trees, the CDT system 102 may be able to determine where the chunks may be found, for example, so that the data object can be reconstructed.

Figure 2B:
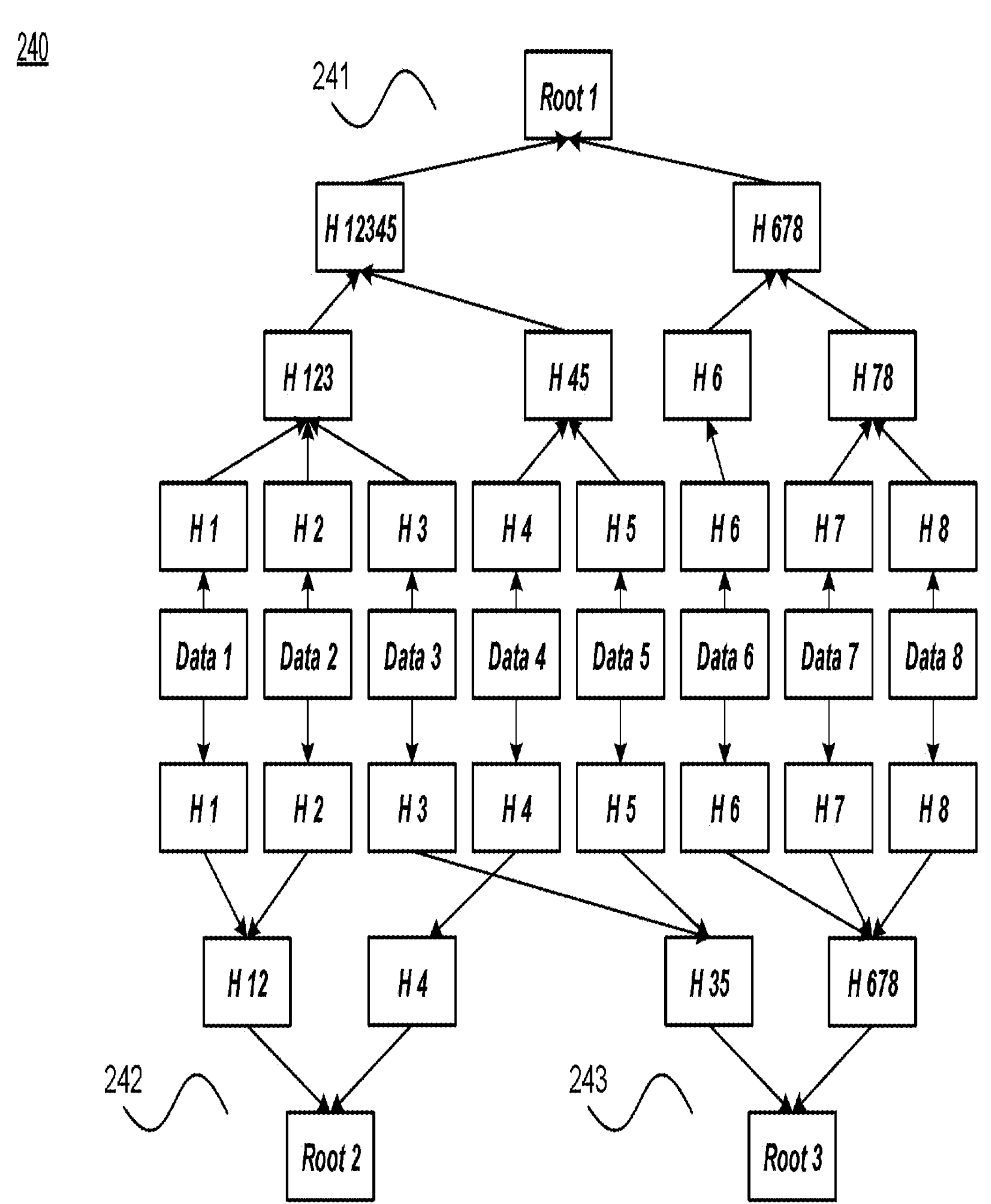
FIG. 2B shows multiple example content-defined trees that may be used to represent a data object and efficiently determine locations of chunks that may be used to recreate the data object, in accordance with one or more embodiments.

For example, referring to FIG. 2B, multiple example content-defined trees that may be used to represent a data object and efficiently determine locations of chunks that may be used to recreate the data object are shown. The content-defined tree 241 may include a first tier of child nodes H1-H8, a second tier of parent nodes H123-H78, a third tier of parent nodes H12345-H678, and a root node Root 1. The content-defined tree 241 may be associated with the data object that includes chunks Data 1-Data 8. The CDT system 102 may use the content-defined tree 241 to determine chunks needed to recreate the data object, for example, if a request for the data object is received.

To distinguish from the content-defined tree 241, which may be specific to the data object represented by chunks Data 1-Data 8, trees 242 and 243 may be referred to as CAS trees 242 and 243. The CAS tree 242 and the CAS tree 241 may be generated in a similar or the same manner as a content-defined tree described in connection with FIG. 1 (e.g., using a rolling hash and condition to group nodes and generate parent nodes). The CAS tree 242 may correspond to multiple chunks including Data 1, Data 2, and Data 4. The CAS tree 243 may correspond to multiple chunks including Data 3, Data, 5, Data 6, Data 7, and Data 8. The nodes of the CAS trees (e.g., nodes H1-H8) may be used to look up the memory locations of the corresponding chunks. For example, the hash of node H1 may be used as a key to retrieve a value indicating a location where the chunk Data 1 is stored in memory.

The CDT system 102 may compare the nodes of the content-defined tree 241 with nodes of the CAS tree 242 or the nodes of the CAS tree 243 to determine where to find the chunks of the corresponding data object. In one comparison, by comparing the hash of the node H678 of the content-defined tree 242 with the hash of the node H678 of the CAS tree 243, the CDT system 102 may determine the locations of the chunks Data 6, Data 7, and Data 8 (e.g., because the hashes match). The CDT system 102 may use a tree search (e.g., breadth first search) approach to compare the nodes of different trees, allowing data to be found more efficiently. For example, because each node's hash is based on hashes of underlying nodes, if a parent node in a content-defined tree matches a parent node in a CAS tree, the locations of each chunk corresponding to any node below the parent node (e.g., any child node) may be determined without the need to compare each child node individually.

Referring back to FIG. 1, the CDT system 102 may obtain a request for a data object. The request may be sent by a user device. For example, the user device may send a request with an identification of a file to the CDT system 102.

The CDT system 102 may retrieve a content-defined tree corresponding to the requested data object. The content-defined tree may include any aspect described above (e.g., in connection with FIG. 1 or FIG. 4). For example, the content-defined tree may include a set of parent nodes, with each parent node corresponding to a set of hashes that have been determined using a rolling hash and a grouping condition. Each parent node may include a hash of a concatenation of each hash in a corresponding set of hashes. The set of parent nodes may form a tier of the content-defined tree. Each hash in each set of hashes may correspond to a chunk in the data object.

In one example, each data object may be associated with a content-defined tree that includes a set of leaf nodes. The set of leaf nodes may include a leaf node for each chunk (e.g., portion) of the data object. In some embodiments, the identification of a data object may include the hash of the root node of the content-defined tree. The CDT system 102 may retrieve the content-defined tree by searching a database for the hash and obtaining a set of nodes (e.g., parent nodes, leaf nodes, etc.) that are connected to the root node. Using a content-defined tree that is specific to the data object may allow the CDT system 102 to efficiently determine all of the chunks that belong to the data object (e.g., all of the chunks that may be needed to reconstruct the data object). Further, a content-defined tree that is specific to the data object may allow the CDT system 102 to more efficiently determine the locations of each chunk within a database. This may be possible, for example, because the content-defined tree can be compared with other content-defined trees that are part of a CAS system as described in more detail below.

The CDT system 102 may traverse the content-defined tree. Traversing the content-defined tree may allow the CDT system 102 to determine whether a CAS tree stored in a database includes a node that matches a node in the content-defined tree. For example, the CDT system 102 may traverse the content-defined tree by obtaining the root node of the content-defined tree. The root node may be compared with nodes in the CAS database 106. If a matching node is found, the CDT system 102 may use the matching node in the CAS database 106 to find the locations of chunks that may be used to reassemble the data object.

The CDT system 102 may compare a node from the content-defined tree with a set of nodes. The set of nodes may correspond to other trees (e.g., CAS trees) stored in a database. In some embodiments, comparing a first node from the content-defined tree with a second node (e.g., corresponding to a CAS tree) may include comparing a first hash of the first node with a second hash of the second node. If the first hash and the second hash are the same, the CDT system 102 may determine that the CAS tree corresponding to the second node can be used to locate one or more chunks of the data object that correspond to the content-defined tree.

By comparing the nodes in this way, the CDT system 102 may be able to more efficiently determine the locations of chunks to reconstruct the data object because comparing hashes from nodes in a tree enables the CDT system 102 to quickly determine large portions of a data object. For example, if a parent node of a CAS tree matches a node in the content-defined tree, the CDT system 102 may retrieve all nodes (e.g., all parent nodes and leaf nodes) that fall under the matching parent node. This may enable the CDT system 102 to find many chunks at once, instead of searching for each chunk individually.

The CDT system 102 may traverse a second content-defined tree. The CDT system 102 may traverse a second content-defined tree, for example, based on the matching node. The second content-defined tree may be a tree that is stored in the CAS database 106 (e.g., the second content-defined tree may be a CAS tree). In one example, based on a hash of the first node matching a hash of a first CAS tree node of the set of CAS tree nodes, the CDT system 102 may traverse a first CAS tree corresponding to the first CAS tree node. In this example, the first CAS tree may include a set of parent nodes, wherein each parent node includes a hash of a concatenation of each hash in a corresponding set of hashes, and wherein each hash in each set of hashes corresponds to a chunk stored in a database. By traversing the second content-defined tree, the CDT system 102 may be able to retrieve the leaf nodes of the second content-defined tree. The leaf nodes may be used to retrieve corresponding data object chunks as explained in more detail below.

The CDT system 102 may obtain a set of child nodes (e.g., leaf nodes). For example, based on traversing the first CAS tree, the CDT system 102 may obtain a set of child nodes of the first CAS tree node. Each child node may include a hash that may be used as a key to retrieve a location of a chunk of the data object.

The CDT system 102 may retrieve the set of data object chunks. For example, the CDT system 102 may input a hash indicated by a child node into a mapping function that returns the corresponding chunk. The CDT system 102 may reconstruct or reassemble the data object using the retrieved data object chunks. For example, the CDT system 102 may arrange the chunks in order and concatenate them to generate the data object.

The CDT system 102 may generate new CAS trees, modify CAS trees, or delete CAS trees based on changes that are made to one or more data objects. The CDT system 102 may determine that a new CAS tree should be generated based on a content-defined tree for a data object. For example, after comparing the nodes of the content-defined tree with nodes in the CAS database 106, the CDT system 102 may determine that there is no corresponding node in the CAS database 106 for one or more nodes in the content-defined tree associated with the data object. The CDT system 102 may generate a new CAS tree for the nodes that do not have a corresponding node in the CAS database 106. The new CAS tree may be generated in a similar or the same manner as a content-defined tree is generated as described above. Based on no CAS tree existing for the portion of the data object, the CDT system 102 may generate a new CAS tree by dividing a portion of the data object that has no corresponding nodes in the CAS database 106 into a set of chunks. Each chunk in the set of chunks may be determined using a boundary that is determined based on a first rolling hash satisfying a first condition and each boundary defines a size of a corresponding chunk. Alternatively, if a content-defined tree has already been created for the data object, the CDT system 102 may use the nodes in the content-defined tree to create the CAS tree and may forego repetition of the data object chunking process.

In this example, generating a new CAS tree may further include generating a set of hashes comprising a cryptographic hash for each chunk of the set of chunks. The set of hashes may form a first tier of the new CAS tree. The CDT system 102 may further generate a set of parent nodes by grouping each hash of the set of hashes based on a second rolling hash satisfying a second condition, and by hashing a concatenation of each resulting group of hashes. The set of parent nodes may form a second tier of the content-defined tree. A first parent node of the set of parent nodes may include a hash that is usable as a key to retrieve each hash in a group of hashes that corresponds to the first parent node. The CDT system 102 may store the new CAS tree in the CAS database 106. The CDT system 102 may store the content-defined tree or the portion of the data object that corresponds to the new CAS tree in the CAS database 106.

In some embodiments, the CDT system 102 may limit the size of a new CAS tree that is generated. For example, based on determining that a portion of the data object (e.g., a portion that has no matching nodes in the CAS database 106) is greater than a threshold size, the CDT system 102 may generate the new CAS tree using a first subpart of the portion of the data object that is less than the threshold size. The CDT system 102 may generate a second new CAS tree using a second subpart of the portion of the data object. In one example, content of the first subpart may not overlap with the second subpart.

In some embodiments, the CDT system 102 may generate a user interface to show what nodes in a content-defined tree correspond to other nodes in a CAS tree. For example, the CDT system 102 may generate a user interface that includes a set of data object chunks and a first CAS tree. The user interface may include one or more elements that indicate an association between a node in the first CAS tree and a corresponding chunk in the set of data object chunks.

Cross-Silo Data Storage and Deduplication

The system 100 may use content-defined trees to set intersections/subtractions of trees representing data in different databases to provide an efficient way to deduplicate data across databases. The CDT system 102 may obtain a request to integrate a legacy database with a CAS database. Integrating the legacy database with the CAS database may include making each database interoperable with each other or may include making the CAS database an extension of the legacy database. For example, the CDT system 102 may be able to use a content-defined tree to efficiently index and retrieve data object chunks that may be split between the legacy database and the CAS database (e.g., with a first portion of the chunks stored in the legacy database and a second portion of the chunks stored in the CAS database). Through the use of content-defined trees (e.g., CAS trees), the legacy database and the CAS database may be able to reduce duplication of data and thereby increase storage capacity. This may be done because the content-defined trees may be data object generic. A content-defined tree may be data object generic when a chunk indicated by the tree may be used in multiple data objects. For example, if two different data objects have an overlapping part (e.g., a portion of the data objects match, a portion of the two data objects have the same text, code, data, etc.), then a chunk that corresponds to the overlapping part may be used to reconstruct each data object and the CDT system 102 may not need to store two separate chunks (e.g., and corresponding nodes of content-defined trees) for each data object.

In some embodiments the legacy database may be owned by a first organization (e.g., company, etc.) and the CAS database may be owned by a second organization. By integrating the two databases together using content-defined trees, each organization may reduce the amount of storage space needed to store their data because any overlapping data may be safely deleted.

The CDT system 102 may generate a first content-defined tree for the legacy database. To enable integration of the legacy database with the CAS database, the CDT system 102 may generate one or more content-defined trees for the data stored in the legacy database. The one or more content-defined trees may be generated in a similar or the same manner as a CAS tree in the CAS database (e.g., as described above in connection with FIG. 1, FIG. 5, or other figures), except that data stored in the legacy database may be used to generate the one or more content-defined trees. In one example, the CDT system 102 may generate a first content-defined tree corresponding to the legacy database, wherein the first content-defined tree comprises a first set of parent nodes, each parent node of the first set of parent nodes corresponding to a set of hashes that have been determined using a rolling hash and a grouping condition, wherein each parent node comprises a hash of a concatenation of each hash in a corresponding set of hashes, wherein the first set of parent nodes form a tier of the first content-defined tree, and wherein each hash in each set of hashes corresponds to a portion of data in the legacy database.

The CDT system 102 may generate any number of content-defined trees for the legacy database. For example, the CDT system 102 may split all of the data in the legacy database into chunks (e.g., using a boundary condition as described in connection with FIG. 1) and generate enough content-defined trees so that each chunk is represented in a content-defined tree. Each content-defined tree may be limited to a threshold size. For example, the maximum amount of data that may be represented by a content-defined tree may be 16 Megabytes (e.g., the sum of all chunks corresponding to one content-defined tree may be no more than 16 Megabytes).

The CDT system 102 may obtain a second content-defined tree from a CAS database. The CAS database may be any CAS database described above in connection with FIG. 1. The second content-defined tree may be data object generic in that one or more chunks associated with the second content-defined tree may be used to reconstruct a variety of data objects. A child node (e.g., leaf node) of the second content-defined tree may include a hash that may be used to retrieve a storage location (e.g., memory address) of a corresponding chunk. For example, the hash may be used as a key to retrieve a value from a mapping data structure that maps hashes to memory locations. In one example, the CDT system 102 may obtain a second content-defined tree corresponding to the CAS database, wherein the second content-defined tree comprises a second set of parent nodes, each parent node in the second set of parent nodes comprising a concatenated hash corresponding to a set of leaf nodes.

The CDT system 102 may compare the first content-defined tree (e.g., corresponding to the legacy database) with the second content-defined tree (e.g., corresponding to the CAS database). The CDT system 102 may compare hashes stored in nodes of the first content-defined tree with hashes stored in nodes of the second content-defined tree.

In some embodiments, the CDT system 102 may use a top-down approach (e.g., starting by comparing root nodes, and then nodes at each tier until leaf nodes are compared). In one example, the CDT system 102 may use a breadth first search to compare nodes. If the hash of a node matches the hash of another node, the CDT system 102 may remove one of the nodes and all children nodes of the node. This may be done because each node is a hash of the hashes of corresponding children nodes. Thus, if the hashes of two parent nodes are the same, the CDT system 102 may assume that the set of leaf nodes that belong to the first parent node is the same as the set of leaf nodes that belong to the second parent node. In this way, the CDT system 102 may be able to delete or remove duplicate nodes from the first content-defined tree or the second content-defined tree and any corresponding data from the legacy database or the CAS database. For example, the CDT system 102 may first compare root nodes of a first content-defined tree in the legacy database and a second content-defined tree in the CAS database. In this example, if the root nodes match, the CDT system 102 may delete the root node, any child nodes of the root node, and any data object chunks that correspond to the child nodes of the root node from the CAS database. By doing so, the CDT system 102 may be able to determine and remove duplicate data more efficiently because comparing parent nodes allows comparison of corresponding children nodes without the need to compare each child node or each data object chunk individually.

The CDT system 102 may remove duplicate nodes from the first content-defined tree or the second content-defined tree. For example, the CDT system 102 may remove a node (e.g., as well as any child nodes of the node) from the second content-defined tree, if the node is present in the first content-defined tree. The CDT system 102 may remove any chunks that correspond to the removed node from a database (e.g., the legacy database or the CAS database). In one example, based on comparing the first content-defined tree with the second content-defined tree, the CDT system 102 may remove a duplicate portion of data from the legacy database or the CAS database.

Figure 2C:
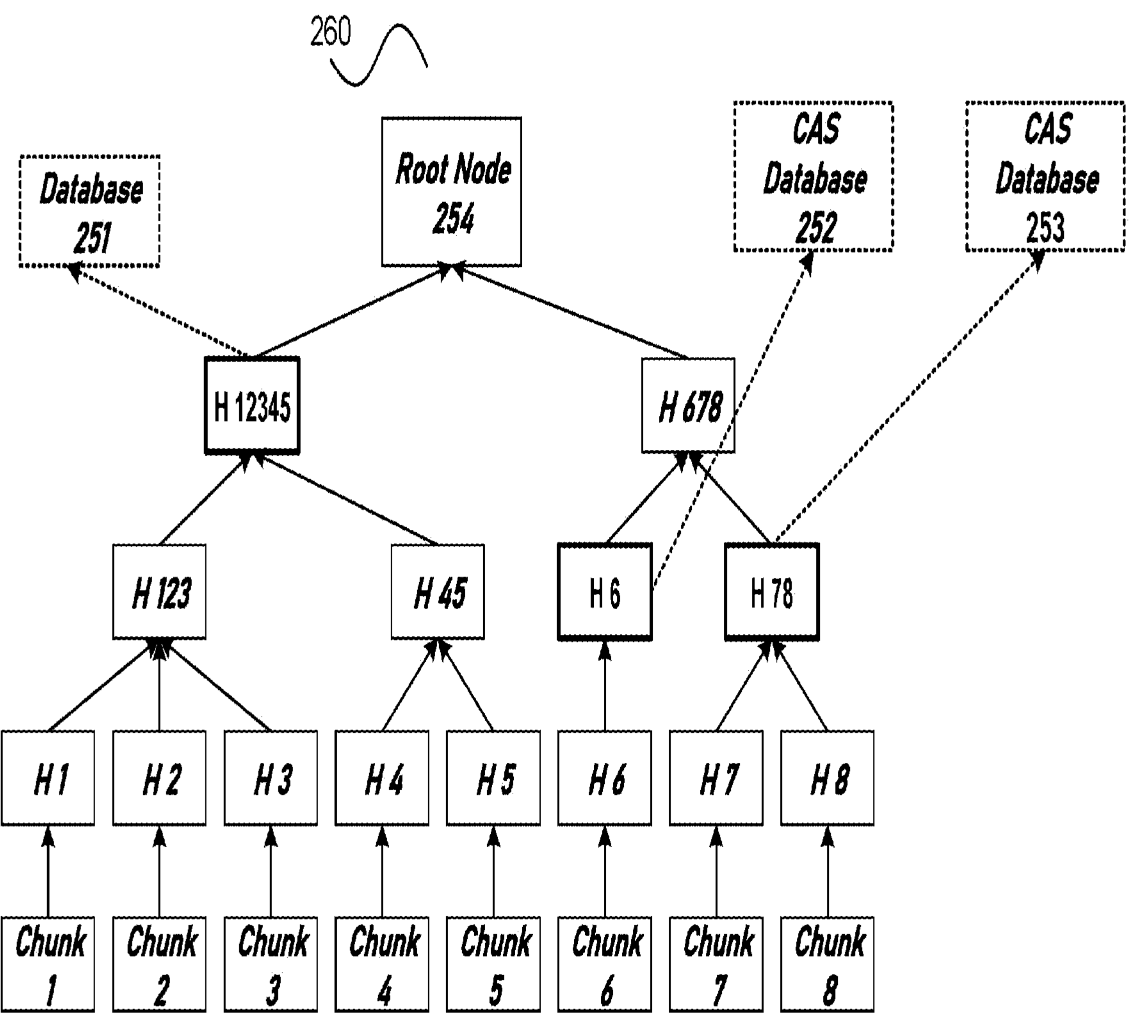
FIG. 2C shows example content-defined trees that may be used to generalize data across multiple databases, in accordance with one or more embodiments.

FIG. 2C shows example content-defined trees that may be used to generalize data across multiple databases. A data object may be represented by the content-defined tree 260. Different portions of the chunks 1-8 used to create the content-defined tree 260 may be found in different databases. For example, the portion of the content-defined tree under node H12345 may be found in database 251. A CAS tree that includes H12345 as the root node may be found in database 251. The chunks 1-5 may be retrieved by the CDT system 102 from the database 251, for example, if the CDT system 102 receives a request for the data object. Chunk 6 and its corresponding parent node H6 may be found in CAS database 252. Chunks 7-8 and their corresponding parent node may be found in CAS database 253. In some embodiments, the CDT system 102 may retrieve a data structure that indicates the locations of each CAS tree or content-defined tree in each database. To reconstruct the data object that includes chunks 1-8, content-defined tree 260 may be traversed to find the data sources (e.g., the database 251, the CAS database 252, and the CAS database 253).

Figure 3:
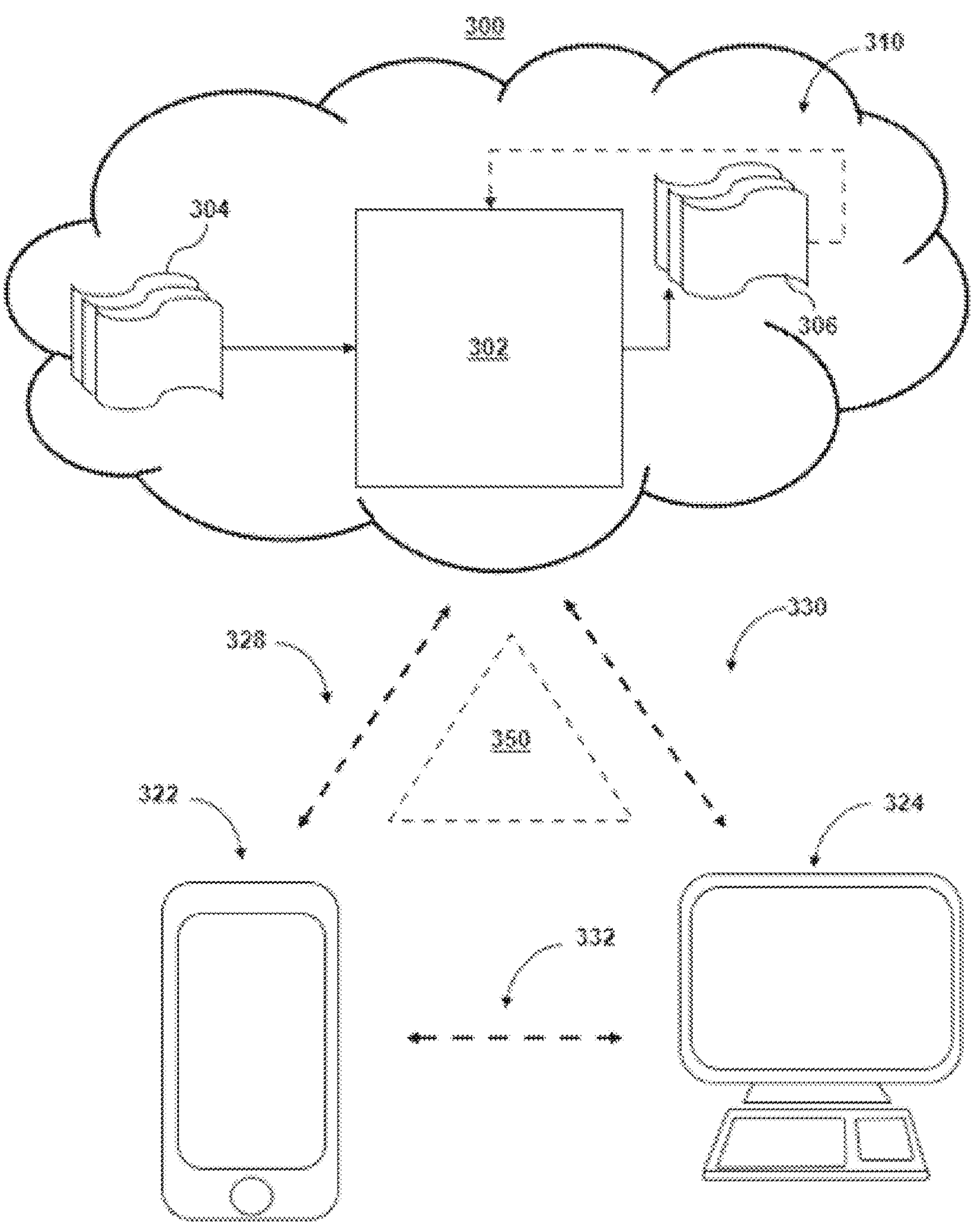
FIG. 3 shows illustrative components for a system that may use content-defined trees, in accordance with one or more embodiments.

FIG. 3 shows illustrative components for a system 300 that may use content-defined trees to index or deduplicate data (e.g., or perform a variety of other aspects described in connection with FIGS. 1, 2A-2C, and 4-6), in accordance with one or more embodiments. The components shown in system 300 may be used to perform any of the functionality described above in connection with FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, mobile devices, and/or any device or system described in connection with FIGS. 1, 2A-2C, and 4. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., content-defined tree related data, hashes, nodes, etc.).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to using content-defined trees to index or deduplicate data (e.g., or perform a variety of other aspects described in connection with FIGS. 1, 2A-2C, and 4-6).

Each of these devices may also include electronic storages. The electronic storages may include non-transitory storage media that electronically stores information. The electronic storage media of the electronic storages may include one or both of (i) a system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the CDT system 102 or the user device 104 described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may use content-defined trees to index or deduplicate data (e.g., or perform a variety of other aspects described in connection with FIGS. 1, 2A-2C, and 4-6).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The model (e.g., model 302) may use content-defined trees to index or deduplicate data (e.g., or perform a variety of other aspects described in connection with FIGS. 1, 2A-2C, and 4-6).

System 300 also includes application programming interface (API) layer 350. API layer 350 may allow the system to generate summaries across different devices. In some embodiments, API layer 350 may be implemented on mobile device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols, such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

Figure 4:
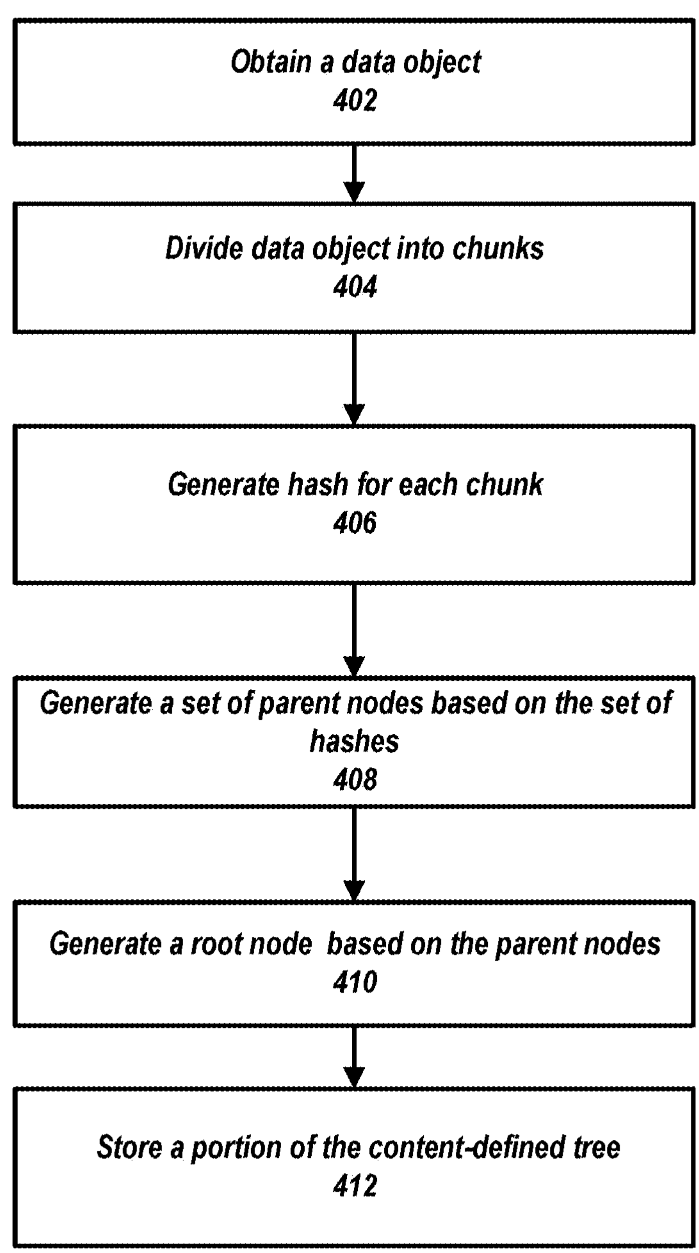
FIG. 4 shows a flowchart of steps involved in generating content-defined trees, in accordance with one or more embodiments.

FIG. 4 shows a flowchart of the steps involved in for generating content-defined trees to store data objects, in accordance with one or more embodiments. Although described as being performed by a computing system, one or more actions described in connection with process 400 of FIG. 4 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 402, a computing system may obtain a data object. The data object may include a string of bytes. The data object may correspond to a file (e.g., CSV, PDF, SQL, or a variety of other data object types). The data object may be associated with a repository of data. For example, the data object may be one data object in a directory containing other data objects.

At step 404, the computing system may divide the data object into chunks. For example, the computing system may divide the string of bytes into a set of chunks, each chunk in the set of chunks having a boundary, wherein each boundary is determined based on a first rolling hash satisfying a first condition and each boundary defines a size of a corresponding chunk. The first condition may be any condition described above in connection with FIG. 1, 2A-2C, or 3. By doing so, the computing system may be able to use the chunks to generate a content-defined tree and may provide a data object storage solution that is well able to handle insertions or deletions made in the middle of the data object. For example, dividing the data object into chunks in this way may allow for insertions and deletions to be made in the middle of the data object without altering every chunk boundary and may prevent the need for the computing system to recompute every chunk for the data object.

At step 406, the computing system may generate a hash for each chunk that was created in step 404. For example, the computing system may generate a set of hashes including a cryptographic hash for each chunk of the set of chunks. The set of hashes may be used to generate a content-defined tree, for example, as described above in connection with FIG. 1-2A-2C, or 3. The set of hashes may form a first tier (e.g., a bottom tier) of a content-defined tree. Other tiers of the content-defined tree may be generated in steps 408-410 as described below.

At step 408, the computing system may generate a set of parent nodes based on the set of hashes. The computing system may assign each hash of the set of hashes to a group based on a second rolling hash and a second condition. The second condition may be a test on the node hash to target an average branching factor or average group size (e.g., four hashes per group on average). In some embodiments, additional constraints many be used to force the number of hashes per group to be between two and eight inclusive. Each group of hashes may correspond to one parent node in the set of parent nodes. The computing system may concatenate each hash in a group of hashes. The computing system may generate a hash of the concatenated hashes to form the parent node of the group of hashes (e.g., the parent node may be the hash of the concatenated hashes). Each parent node may include a hash that is usable as a key to retrieve each hash in the corresponding group of hashes. For example, a first parent node may include a hash that may key to a data structure that includes each hash of the group of hashes that was used to generate the first parent node. The parent nodes may form a second tier of the content-defined tree.

One technical problem in existing systems is that a small change in the number of chunks (e.g., a chunk insertion at the left, right, middle, etc.), will induce a complete rewrite of a tree built from the chunks. By generating a set of parent nodes using a rolling hash as described here in step 408, the computing system may be resilient against chunks that are added and removed. For example, even if a chunk is added or removed, only a small portion of the parent nodes may be recomputed rather than the entire set of parent nodes.

In some embodiments, a parent node may further include a hash of a MAC. For example, the computing system may generate a hash of a MAC together with a corresponding concatenation of each hash in a group of hashes. For example, both the MAC and group of hashes may be input into the hashing function to generate a single hash. By doing so, the computing system may ensure that for any two different strings (e.g., hashes, groups of hashes, etc.) there are no collisions. This may prevent two different chunks, groups of chunks, or parent nodes from having the same hash.

At step 410, the computing system may generate a root node based on the parent nodes generated at step 408. For example, the computing system may merge each of the parent nodes to form the root node. In one example, the computing system may generate the root node by applying a rolling hash with a condition (e.g., the condition used in step 408) to the set of parent nodes. Based on applying the rolling hash, the computing system may determine that each parent node in the set of parent nodes should be combined into one group. In response, the computing system may concatenate each of the parent nodes (e.g., the hashes of the parent nodes) and generate a hash of the concatenation. The root node may comprise the hash of the concatenation. At step 412, the computing system may store a portion of the content-defined tree (e.g., in the database 106).

In some embodiments, the computing system may generate a content-defined tree that includes multiple data objects or an entire data repository. For example, the data object obtained in step 402 may be part of a set of data objects that is stored in a data repository. The computing system may generate, based on the data repository, a metadata store comprising a directory layout and metadata of the data repository. The computing system may generate a byte stream comprising a concatenation of all bytes of all data objects in the data repository. The concatenation may be sorted in hash order. The computing system may generate a second content-defined tree based on the byte stream. In some embodiments, the computing system may insert a chunk boundary at an end of each data object in the data repository. This may cause a new chunk to be created for the beginning of every data object or data object in the repository.

In some embodiments, the data repository may correspond to a dataset for training a machine learning model. The computing system may use the content-defined tree to split the data repository into train, test, validation, or other sets to use in training the machine learning model. The computing system may designate a first portion of the set of parent nodes as a training dataset and a second portion of the set of parent nodes as a testing dataset; and training the machine learning model using the training dataset and the testing dataset.

In some embodiments, the computing system may use the content-defined tree to compare data objects to determine a difference between the data objects. For example, the computing system may determine, based on a comparison of the content-defined tree with a second content-defined tree, that the data object has been modified. Based on the modification to the data object, the computing system may update a hash of a parent node of the set of parent nodes to include the modification. For example, one or more new chunks may be generated for the data object because of the modification made to the data object. A new hash may be created for a new chunk that is created and may be inserted into the content-defined tree. Any parent nodes of the new hash may be generated based on the changes.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or to increase the speed of the system or method. Furthermore, it should be noted that any of the components, devices, or equipment discussed in relation to the figures above could be used to perform one or more of the steps in FIG. 4.

Figure 5:
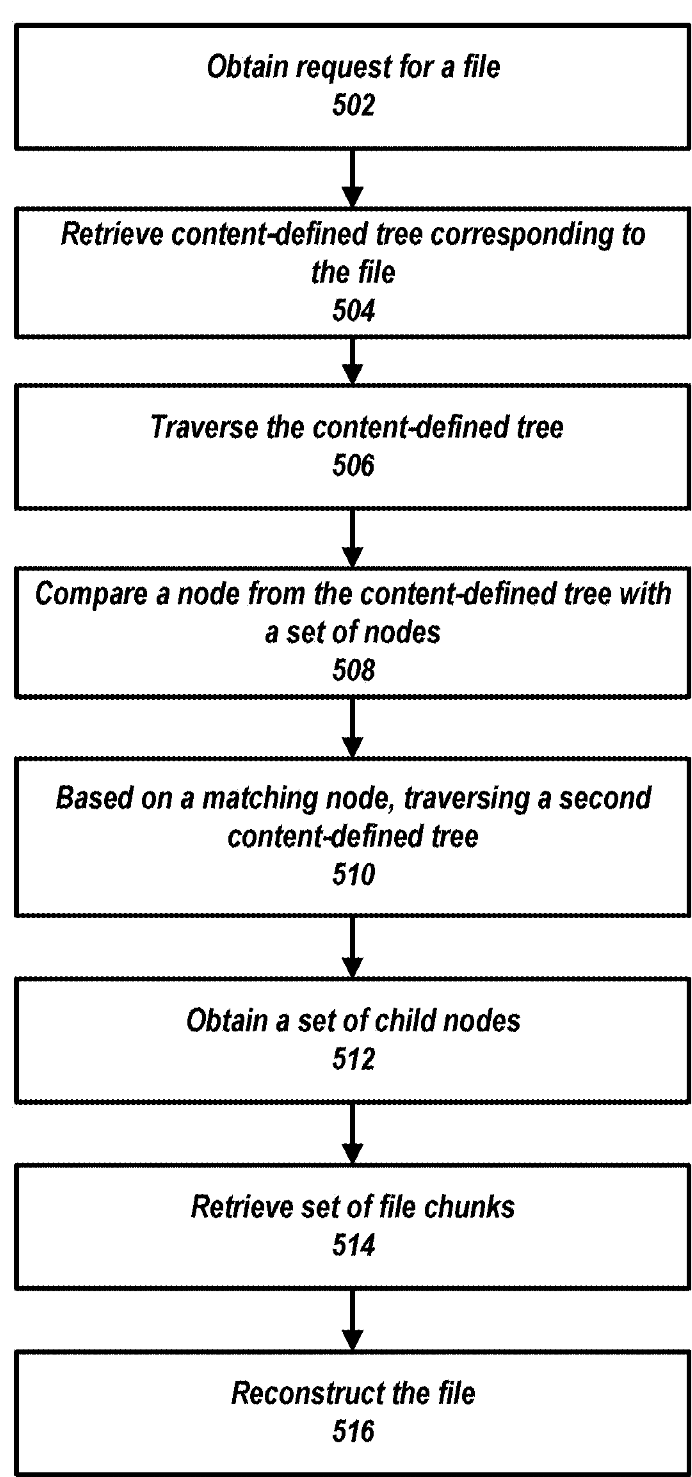
FIG. 5 shows a flowchart of steps involved in retrieving chunks for reconstructing a data object, in accordance with one or more embodiments.

FIG. 5 shows a flowchart of the steps involved in for generating content-defined trees to store data objects, in accordance with one or more embodiments. Although described as being performed by a computing system, one or more actions described in connection with process 500 of FIG. 5 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 502, a computing system may obtain a request for a data object or for a portion of data. The request may be sent by a user device. For example, the user device may send a request with an identification of the data object to the computing system.

At step 504, the computing system may retrieve a content-defined tree corresponding to the requested data object. The content-defined tree may include any aspect described above (e.g., in connection with FIG. 1 or FIG. 4). For example, the content-defined tree may include a set of parent nodes, each parent node corresponding to a set of hashes that have been determined using a rolling hash and a grouping condition, wherein each parent node comprises a hash of a concatenation of each hash in a corresponding set of hashes, wherein the set of parent nodes form a tier of the content-defined tree, and wherein each hash in each set of hashes corresponds to a chunk in the data object.

In one example, each data object may be associated with a content-defined tree that includes a set of leaf nodes. The set of leaf nodes may include a leaf node for each chunk (e.g., portion) of the data object. In some embodiments, the identification of a data object may include the hash of the root node of the content-defined tree. The computing system may retrieve the content-defined tree by searching a database for the hash and obtaining a set of nodes (e.g., parent nodes, leaf nodes, etc.) that are connected to the root node. Using a content-defined tree that is specific to the data object may allow the computing system to efficiently determine all of the chunks that belong to the data object (e.g., all of the chunks that may be needed to reconstruct the data object). Further, a content-defined tree that is specific to the data object may allow the computing system to more efficiently determine the locations of each chunk within a database. This may be possible, for example, because the content-defined tree can be compared with other content-defined trees that are part of a CAS system as described in more detail below.

At step 506, the computing system may traverse the content-defined tree. Traversing the content-defined tree may allow the computing system to determine whether a CAS tree stored in a database includes a node that matches a node in the content-defined tree. For example, the computing system may traverse the content-defined tree by obtaining the root node of the content-defined tree. The root node may be compared with nodes in the CAS system. If a matching node is found, the computing system may use the matching node in the CAS system to find the locations of chunks that may be used to reassemble the data object.

At step 508, the computing system may compare a node from the content-defined tree with a set of nodes. The set of nodes may correspond to other trees (e.g., CAS trees) stored in a database. In some embodiments, comparing a first node from the content-defined tree with a second node (e.g., corresponding to a CAS tree) may include comparing a first hash of the first node with a second hash of the second node. If the first hash and the second hash are the same, the computing system may determine that the CAS tree corresponding to the second node can be used to locate one or more chunks of the data object that corresponds to the content-defined tree.

By comparing the nodes in this way, the computing system may be able to more efficiently determine the locations of chunks to reconstruct the data object because comparing hashes from nodes in a tree enables the computing system to quickly determine large portions of a data object. For example, if a parent node of a CAS tree matches a node in the content-defined tree, the computing system may retrieve all nodes (e.g., all parent nodes and leaf nodes) that fall under the matching parent node. This may enable the computing system to find many chunks at once, instead of searching for each chunk individually.

At step 510, the computing system may traverse a second content-defined tree. The computing system may traverse a second content-defined tree, for example, based on the matching node. The second content-defined tree may be a tree that is stored in CAS (e.g., the second content-defined tree may be a CAS tree). In one example, based on a hash of the first node matching a hash of a first CAS tree node of the set of CAS tree nodes, the computing system may traverse a first CAS tree corresponding to the first CAS tree node. In this example, the first CAS tree may include a set of parent nodes, wherein each parent node includes a hash of a concatenation of each hash in a corresponding set of hashes, and wherein each hash in each set of hashes corresponds to a chunk stored in a database. By traversing the second content-defined tree (e.g., that corresponds to the matching node determined in step 508), the computing system may be able to retrieve the leaf nodes of the second content-defined tree. The leaf nodes may be used to retrieve corresponding data object chunks as explained in more detail below.

At step 512, the computing system may obtain a set of child nodes (e.g., leaf nodes). For example, based on traversing the first CAS tree, the computing system may obtain a set of child nodes of the first CAS tree node. Each child node may include a hash that may be used as a key to retrieve a location of a chunk of the data object.

At step 514, the computing system may retrieve the set of data object chunks. For example, the computing system may input a hash indicated by a child node into a mapping function that returns the corresponding chunk. At step 516, the computing system may reconstruct or reassemble the data object using the retrieved data object chunks. For example, the computing system may arrange the chunks in order and concatenate them to generate the data object.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or to increase the speed of the system or method. Furthermore, it should be noted that any of the components, devices, or equipment discussed in relation to the figures above could be used to perform one or more of the steps in FIG. 5.

Figure 6:
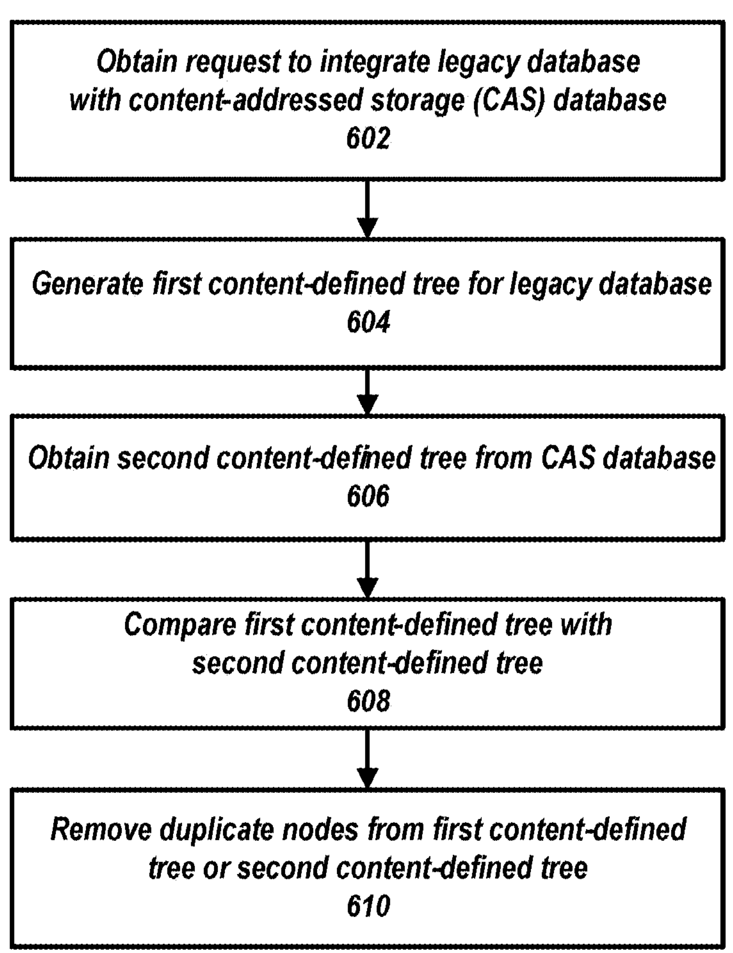
FIG. 6 shows a flowchart of steps involved in integrating databases through the use of content-defined trees, in accordance with one or more embodiments.

FIG. 6 shows a flowchart of the steps involved in for generating content-defined trees to store data objects, in accordance with one or more embodiments. Although described as being performed by a computing system, one or more actions described in connection with process 600 of FIG. 6 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 602, a computing system may obtain a request to integrate a legacy database with a CAS database. Integrating the legacy database with the CAS database may include making each database interoperable with each other or may include making the CAS database an extension of the legacy database. For example, the computing system may be able to use a content-defined tree to efficiently index and retrieve data object chunks that may be split between the legacy database and the CAS database (e.g., with a first portion of the chunks stored in the legacy database and a second portion of the chunks stored in the CAS database). Through the use of content-defined trees (e.g., CAS trees), the legacy database and the CAS database may be able to reduce duplication of data and thereby increase storage capacity. This may be done because the content-defined trees may be data object generic. A content-defined tree may be data object generic when a chunk indicated by the tree may be used in multiple data objects. For example, if two different data objects have an overlapping part (e.g., a portion of the data objects match, a portion of the two data objects have the same text, code, data, etc.), then a chunk that corresponds to the overlapping part may be used reconstruct each data object and the computing system may not need to store two separate chunks (e.g., and corresponding nodes of content-defined trees) for each data object.

In some embodiments the legacy database may be owned by a first organization (e.g., company, etc.) and the CAS database may be owned by a second organization. By integrating the two databases together using content-defined trees (e.g., as explained in more detail below), each organization may reduce the amount of storage space needed to store their data because any overlapping data may be safely deleted.

At step 604, the computing system may generate a first content-defined tree for the legacy database. To enable integration of the legacy database with the CAS database, the computing system may generate one or more content-defined trees for the data stored in the legacy database. The one or more content-defined trees may be generated in a similar or the same manner as a CAS tree in the CAS database (e.g., as described above in connection with FIG. 1, FIG. 5, or other figures), except that data stored in the legacy database may be used to generate the one or more content-defined trees. In one example, the computing system may generate a first content-defined tree corresponding to the legacy database, wherein the first content-defined tree comprises a first set of parent nodes, each parent node of the first set of parent nodes corresponding to a set of hashes that have been determined using a rolling hash and a grouping condition, wherein each parent node comprises a hash of a concatenation of each hash in a corresponding set of hashes, wherein the first set of parent nodes form a tier of the first content-defined tree, and wherein each hash in each set of hashes corresponds to a portion of data in the legacy database.

The computing system may generate any number of content-defined trees for the legacy database. For example, the computing system may split all of the data in the legacy database into chunks (e.g., using a boundary condition as described in connection with FIG. 1) and generate enough content-defined trees so that each chunk is represented in a content-defined trees. Each content-defined tree may be limited to a threshold size. For example, the maximum amount of data that may be represented by a content-defined tree may be 16 Megabytes (e.g., the sum of all chunks corresponding to one content-defined tree may be no more than 16 Megabytes).

At step 606, the computing system may obtain a second content-defined tree from a CAS database. The CAS database may be any CAS database described above in connection with FIG. 1. The second content-defined tree may be data object generic in that one or more chunks associated with the second content-defined tree may be used to reconstruct a variety of data objects. A child node (e.g., leaf node) of the second content-defined tree may include a hash that may be used to retrieve a storage location (e.g., memory address) of a corresponding chunk. For example, the hash may be used as a key to retrieve a value from a mapping data structure that maps hashes to memory locations. In one example, the computing system may obtain a second content-defined tree corresponding to the CAS database, wherein the second content-defined tree comprises a second set of parent nodes, each parent node in the second set of parent nodes comprising a concatenated hash corresponding to a set of leaf nodes.

At step 608, the computing system may compare the first content-defined tree (e.g., corresponding to the legacy database) with the second content-defined tree (e.g., corresponding to the CAS database). The computing system may compare hashes stored in nodes of the first content-defined tree with hashes stored in nodes of the second content-defined tree.

In some embodiments, the computing system may use a top-down approach (e.g., starting by comparing root nodes, and then nodes at each tier until leaf nodes are compared). In one example, the computing system may use a breadth first search to compare nodes. If the hash of a node matches the hash of another node, the computing system may remove one of the nodes and all children nodes of the node. This may be done because each node is a hash of the hashes of corresponding children nodes. Thus if the hashes of two parent nodes are the same, the computing system may assume that the set of leaf nodes that belong to the first parent node is the same as the set of leaf nodes that belong to the second parent node. In this way, the computing system may be able to delete or remove duplicate nodes from the first content-defined tree or the second content-defined tree and any corresponding data from the legacy database or the CAS database. For example, the computing system may first compare root nodes of a first content-defined tree in the legacy database and a second content-defined tree in the CAS database. In this example, if the root nodes match, the computing system may delete the root node, any child nodes of the root node, and any data object chunks that correspond to the child nodes of the root node from the CAS database. By doing so, the computing system may be able to determine and remove duplicate data more efficiently because comparing parent nodes allows comparison of corresponding children nodes without the need to compare each child node or each data object chunk individually.

At step 610, the computing system may remove duplicate nodes from the first content-defined tree or the second content-defined tree. For example, the computing system may remove a node (e.g., as well as any child nodes of the node) from the second content-defined tree, if the node is present in the first content-defined tree. The computing system may remove any chunks that correspond to the removed node from a database (e.g., the legacy database or the CAS database). In one example, based on comparing the first content-defined tree with the second content-defined tree, the computing system may remove a duplicate portion of data from the legacy database or the CAS database.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or to increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: obtaining a data object comprising a string of bytes; dividing the string of bytes into a set of chunks, each chunk in the set of chunks having a boundary, wherein each boundary is determined based on a first rolling hash satisfying a first condition and each boundary defines a size of a corresponding chunk; generating a content-defined tree by: generating a set of hashes comprising a cryptographic hash for each chunk of the set of chunks, wherein the set of hashes form a first tier of the content-defined tree; generating a set of parent nodes by grouping each hash of the set of hashes based on a second rolling hash satisfying a second condition, and by hashing a concatenation of each resulting group of hashes, wherein the set of parent nodes form a second tier of the content-defined tree; and generating a root node by merging each node in the set of parent nodes; and storing a portion of the content-defined tree in a database.

2. The method of any of the preceding embodiments, wherein generating the root node by merging each node in the set of parent nodes comprises: based on applying the second rolling hash and the second condition to the set of parent nodes, determining that each parent node in the set of parent nodes should be combined into one group; and generating a hash of a concatenation of hashes corresponding to the set of parent nodes.

3. The method of any of the preceding embodiments, wherein the second condition is configured to provide an average group size of 4.

4. The method of any of the preceding embodiments, wherein the second condition is configured to force a number of hashes in a group of hashes to be between two and eight.

5. The method of any of the preceding embodiments, wherein generating a set of parent nodes further comprises hashing a MAC with a corresponding concatenation of each resulting group of hashes.

6. The method of any of the preceding embodiments, wherein the data object is stored in a data repository with a set of data objects, the method further comprising: generating, based on the data repository, a metadata store comprising a directory layout and metadata of the data repository; generating a byte stream comprising a concatenation of all bytes of all data object in the data repository, wherein the concatenation is sorted in hash order; and generating a second content-defined tree based on the byte stream.

7. The method of any of the preceding embodiments, wherein generating the second content-defined tree comprises inserting a chunk boundary at an end of each data object in the data repository.

8. The method of any of the preceding embodiments, wherein the data repository corresponds to a dataset for training a machine learning model, the method further comprising: designating a first portion of the set of parent nodes as a training dataset and a second portion of the set of parent nodes as a testing dataset; and training the machine learning model using the training dataset and the testing dataset.

9. The method of any of the preceding embodiments, wherein a first parent node of the set of parent nodes comprises a hash that is usable as a key to retrieve each hash in a group of hashes that corresponds to the first parent node.

10. The method of any of the preceding embodiments, further comprising: determining, based on a comparison of the content-defined tree with a second content-defined tree, that the data object has been modified; and updating a hash of a parent node of the set of parent nodes based on a modification of the data object.

11. A method comprising: obtaining a request for a data object in a database, wherein the request comprises an identification of the data object; based on the request and the identification of the data object, retrieving a content-defined tree corresponding to the data object; determining a first node by traversing the content-defined tree; comparing the first node with a set of CAS tree nodes; based on a hash of the first node matching a hash of a first CAS tree node of the set of CAS tree nodes, traversing a first CAS tree corresponding to the first CAS tree node, wherein the first CAS tree comprises a set of parent nodes, wherein each parent node comprises a hash of a concatenation of each hash in a corresponding set of hashes, and wherein each hash in each set of hashes corresponds to a chunk stored in the database; based on traversing the first CAS tree, obtaining a set of child nodes of the first CAS tree node, wherein each child node corresponds to a chunk of the data object; retrieving, based on the set of child nodes, a set of data object chunks; and reconstructing the data object based on the set of data object chunks.

12. The method of any of the preceding embodiments, wherein the content-defined tree comprises a set of parent nodes, each parent node corresponding to a set of hashes that have been determined using a rolling hash and a grouping condition, wherein each parent node comprises a hash of a concatenation of each hash in a corresponding set of hashes, wherein the set of parent nodes form a tier of the content-defined tree, and wherein each hash in each set of hashes corresponds to a chunk in the data object.

13. The method of any of the preceding embodiments, further comprising: determining, based on the content-defined tree and the set of CAS tree nodes, that no CAS tree exists for a portion of the data object; and based on no CAS tree existing for the portion of the data object, generating a new CAS tree by: determining a second set of chunks, wherein a total size of the second set of chunks is less than a threshold size; and generating leaf nodes of the new CAS tree, wherein each leaf node corresponds to a chunk of the second set of chunks.

14. The method of any of the preceding embodiments, wherein each parent node of the first CAS tree comprises a hash that may be used to index to one or more locations in the database where a corresponding chunks is stored.

15. The method of any of the preceding embodiments, further comprising: generating a user interface comprising the set of data object chunks and the first CAS tree, wherein the user interface indicates an association between a node in the first CAS tree and a corresponding chunk in the set of data object chunks.

16. The method of any of the preceding embodiments, further comprising: determining, based on the content-defined tree and the set of CAS tree nodes, that no CAS tree exists for a portion of the data object; based on no CAS tree existing for the portion of the data object, generating a new CAS tree by: dividing the portion of the data object into a set of chunks, each chunk in the set of chunks having a boundary, wherein each boundary is determined based on a first rolling hash satisfying a first condition and each boundary defines a size of a corresponding chunk; generating a set of hashes comprising a cryptographic hash for each chunk of the set of chunks, wherein the set of hashes form a first tier of the new CAS tree; and generating a set of parent nodes by grouping each hash of the set of hashes based on a second rolling hash satisfying a second condition, and by hashing a concatenation of each resulting group of hashes, wherein the set of parent nodes form a second tier of the content-defined tree, wherein a first parent node of the set of parent nodes comprises a hash that is usable as a key to retrieve each hash in a group of hashes that corresponds to the first parent node; and storing the new CAS tree and the portion of the data object in the database.

17. The method of any of the preceding embodiments, further comprising: based on determining that the portion of the data object is greater than a threshold size, causing generation of the new CAS tree to use a first subpart of the portion of the data object that is less than the threshold size; and generating a second new CAS tree using a second subpart of the portion of the data object, wherein content of the first subpart does not overlap with the second subpart.

18. The method of any of the preceding embodiments, wherein reconstructing the data object based on the set of data object chunks comprises: retrieving additional data object chunks based on a second set of parent nodes corresponding to a second database remote from the database; and reconstructing the data object based on the set of data object chunks and the additional data object chunks.

19. A method for using content-defined trees to index and deduplicate data stored in multiple databases, the method comprising: obtaining a request to integrate first data of a first database with second data of a second database; generating a first content-defined tree corresponding to the first database, wherein the first content-defined tree comprises a first set of parent nodes, each parent node of the first set of parent nodes corresponding to a set of hashes that have been determined using a rolling hash and a grouping condition, wherein each parent node comprises a hash of a concatenation of each hash in a corresponding set of hashes, and wherein each hash in each set of hashes corresponds to a portion of data in the first database; obtaining a second content-defined tree corresponding to the second database; and based on comparing the first content-defined tree with the second content-defined tree, removing a duplicate portion of data from the first database or the second database.

20 The method of any of the preceding embodiments, further comprising: obtaining a request for a data object associated with the second database; based on the request, retrieving a data object specific content-defined tree comprising a data object-specific set of parent nodes indicating each chunk of data used to recreate the data object; determining a first node by traversing the data object-specific content-defined tree; and determining a location of data associated with the data object based on a comparison of the first node with the first content-defined tree.

21. The method of any of the preceding embodiments, wherein determining a location of data associated with the data object comprises: comparing the first node with the first set of parent nodes of the first content-defined tree and the second set of parent nodes of the second content-defined tree; based on a hash of the first node matching a hash of a node of the first content-defined tree, obtaining a set of child nodes, wherein a first subset of the set of child nodes is obtained from the first database and a second subset of the set of child nodes is obtained from the second database; and retrieving, based on the set of child nodes, a set of data object chunks.

22. The method of any of the preceding embodiments, wherein each child node comprises a hash usable as a key to retrieve a location of a chunk of the data object.

23. The method of any of the preceding embodiments, wherein removing a duplicate portion of data from the first database or the second database comprises: performing a breadth first search on the first content-defined tree and the second content-defined tree; based on the breadth first search, determining that a parent node of the first content-defined tree comprises a first hash that matches a second hash of a parent node of the second content-defined tree; and based on the first hash matching the second hash, deleting data associated with the parent node of the second content-defined tree.

24. The method of any of the preceding embodiments, further comprising: generating a user interface comprising an indication of a node in the first content-defined tree that matches a node in the second content-defined tree; and causing display of the user interface.

25. The method of any of the preceding embodiments, wherein the second content-defined tree comprises a second set of parent nodes, each parent node in the second set of parent nodes comprising a concatenated hash corresponding to a set of leaf nodes.

26. The method of any of the preceding embodiments, further comprising: based on a request for a data object, determining, based on the first content-defined tree corresponding to the first database, a plurality of chunks; sending the plurality of chunks to a user device; and based on determining that a change has been made to the data object, modifying the second content-defined tree of the second database to include an additional parent node corresponding to the change that was made to the data object.

27. A tangible, non-transitory, machine-readable medium storing instructions that, when executed by a data processing apparatus, cause the data processing apparatus to perform operations comprising those of any of embodiments 1-26.

28. A system comprising one or more processors; and memory storing instructions that, when executed by the processors, cause the processors to effectuate operations comprising those of any of embodiments 1-26.

29. A system comprising means for performing any of embodiments 1-26.

The invention claimed is:

1. A system for storing large data objects in a format that can be efficiently modified through use of content-defined trees, the system comprising:

one or more processors; and a non-transitory, computer-readable medium having instructions recorded thereon that, when executed by the one or more processors, cause operations comprising:

obtaining a data object comprising a string of bytes;

dividing the string of bytes into a set of chunks, each chunk in the set of chunks having a boundary, wherein each boundary is determined based on a first rolling hash satisfying a first condition and each boundary defines a size of a corresponding chunk;

generating a content-defined tree by:

generating a set of hashes comprising a cryptographic hash for each chunk of the set of chunks, wherein the set of hashes form a first tier of the content-defined tree; and generating a set of parent nodes by grouping each hash of the set of hashes based on a second rolling hash satisfying a second condition, and by hashing a concatenation of each resulting group of hashes, wherein the set of parent nodes form a second tier of the content-defined tree, wherein a first parent node of the set of parent nodes comprises a hash that is usable as a key to retrieve each hash in a group of hashes that corresponds to the first parent node; and storing a portion of the content-defined tree in a database.

2. A computer-implemented method for storing large data objects in a format that can be efficiently modified through use of content-defined trees, the method comprising executing, by one or more processors, operations comprising:

obtaining a data object comprising a string of bytes;

dividing the string of bytes into a set of chunks, each chunk in the set of chunks having a boundary, wherein each boundary is determined based on a first rolling hash satisfying a first condition and each boundary defines a size of a corresponding chunk;

generating a content-defined tree by:

generating a set of hashes comprising a cryptographic hash for each chunk of the set of chunks, wherein the set of hashes form a first tier of the content-defined tree; and generating a set of parent nodes by grouping each hash of the set of hashes based on a second rolling hash satisfying a second condition, and by hashing a concatenation of each resulting group of hashes, wherein the set of parent nodes form a second tier of the content-defined tree; and storing a portion of the content-defined tree in a database.

3. The computer-implemented method of claim 2, further comprising:

generating a root node by merging each node in the set of parent nodes by, based on applying the second rolling hash and the second condition to the set of parent nodes, determining that each parent node in the set of parent nodes should be combined into one group; and generating a hash of a concatenation of hashes corresponding to the set of parent nodes.

4. The computer-implemented method of claim 2, wherein the second condition is configured to provide an average group size of four.

5. The computer-implemented method of claim 2, wherein the second condition is configured to force a number of hashes in a group of hashes to be between two and eight.

6. The computer-implemented method of claim 2, wherein generating a set of parent nodes further comprises hashing a message authentication code with a corresponding concatenation of each resulting group of hashes.

7. The computer-implemented method of claim 2, wherein the data object is stored in a data repository with a set of data objects, the method further comprising executing, by one or more processors, operations comprising:

generating, based on the data repository, a metadata store comprising a directory layout and metadata of the data repository;

generating a byte stream comprising a concatenation of all bytes of all data object in the data repository, wherein the concatenation is sorted in hash order; and generating a second content-defined tree based on the byte stream.

8. The computer-implemented method of claim 7, wherein generating the second content-defined tree comprises inserting a chunk boundary at an end of each data object in the data repository.

9. The computer-implemented method of claim 7, wherein the data repository corresponds to a dataset for training a machine learning model, the method further comprising executing, by one or more processors, operations comprising:

designating a first portion of the set of parent nodes as a training dataset and a second portion of the set of parent nodes as a testing dataset; and training the machine learning model using the training dataset and the testing dataset.

10. The computer-implemented method of claim 2, wherein a first parent node of the set of parent nodes comprises a hash that is usable as a key to retrieve each hash in a group of hashes that corresponds to the first parent node.

11. The computer-implemented method of claim 2, further comprising executing, by one or more processors, operations comprising:

determining, based on a comparison of the content-defined tree with a second content-defined tree, that the data object has been modified; and based on the data object having been modified, updating a hash of a parent node of the set of parent nodes indicating a modification.

12. A non-transitory, computer-readable medium comprising instructions that when executed by one or more processors, causes operations comprising:

obtaining a data object comprising a string of bytes;

dividing the string of bytes into a set of chunks, each chunk in the set of chunks having a boundary, wherein each boundary is determined based on a first rolling hash satisfying a first condition and each boundary defines a size of a corresponding chunk;

generating a content-defined tree by:

generating a set of hashes comprising a cryptographic hash for each chunk of the set of chunks, wherein the set of hashes form a first tier of the content-defined tree; and generating a set of parent nodes by grouping each hash of the set of hashes based on a second rolling hash satisfying a second condition, and by hashing a concatenation of each resulting group of hashes, wherein the set of parent nodes form a second tier of the content-defined tree; and storing a portion of the content-defined tree in a database.

13. The non-transitory, computer-readable medium of claim 12 further storing instructions which, when executed by the one or more processors, cause operations comprising:

generating a rood node by merging each node int eh set of parent nodes by, based on applying the second rolling hash and the second condition to the set of parent nodes, determining that each parent node in the set of parent nodes should be combined into one group; and generating a hash of a concatenation of hashes corresponding to the set of parent nodes.

14. The non-transitory, computer-readable medium of claim 12, wherein the second condition is configured to provide an average group size of four.

15. The non-transitory, computer-readable medium of claim 12, wherein the second condition is configured to force a number of hashes in a group of hashes to be between two and eight.

16. The non-transitory, computer-readable medium of claim 12, wherein generating a set of parent nodes further comprises hashing a message authentication code with a corresponding concatenation of each resulting group of hashes.

17. The non-transitory, computer-readable medium of claim 12, wherein the data object is stored in a data repository with a set of data objects, the operations further comprising:

generating, based on the data repository, a metadata store comprising a directory layout and metadata of the data repository;

generating a byte stream comprising a concatenation of all bytes of all data object in the data repository, wherein the concatenation is sorted in hash order; and generating a second content-defined tree based on the byte stream.

18. The non-transitory, computer-readable medium of claim 17, wherein generating the second content-defined tree comprises inserting a chunk boundary at an end of each data object in the data repository.

19. The non-transitory, computer-readable medium of claim 17, wherein the data repository corresponds to a dataset for training a machine learning model, the operations further comprising:

designating a first portion of the set of parent nodes as a training dataset and a second portion of the set of parent nodes as a testing dataset; and training the machine learning model using the training dataset and the testing dataset.

20. The non-transitory, computer-readable medium of claim 17, wherein a first parent node of the set of parent nodes comprises a hash that is usable as a key to retrieve each hash in a group of hashes that corresponds to the first parent node.

* * * * *